No. 683,863. Patented Oct. 1, 1901.
P. SEMMER.
PROCESS OF FORMING FLARED ADHERENT POINTS TO BACKS OF GLASS TILES, WALL SLABS, &c.
(Application filed Jan. 22, 1900.)
(No Model.)
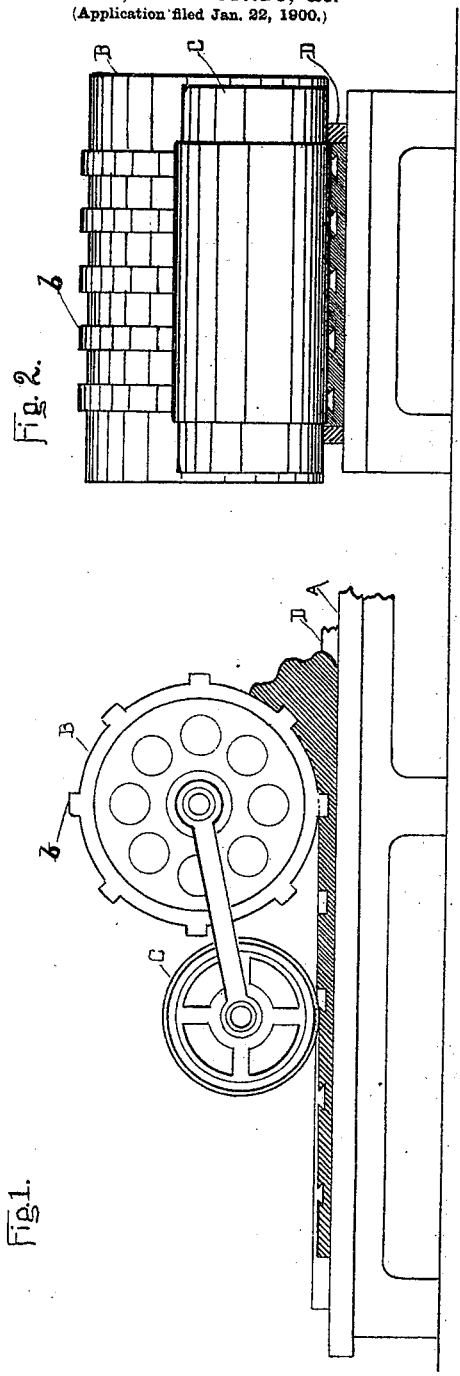
WITNESSES:
INVENTOR.

UNITED STATES PATENT OFFICE.

PHILLIP SEMMER, OF IRWIN, PENNSYLVANIA.

PROCESS OF FORMING FLARED ADHERENT POINTS TO BACKS OF GLASS TILES, WALL-SLABS, &c.

SPECIFICATION forming part of Letters Patent No. 683,863, dated October 1, 1901.

Application filed January 22, 1900. Serial No. 2,271. (No specimens.)

*To all whom it may concern:*

Be it known that I, PHILLIP SEMMER, a citizen of the United States, residing at Irwin, in the county of Westmoreland and State of Pennsylvania, have invented certain new and useful Improvements in Processes of Forming Flared Adhering Points to Backs of Glass Tiles, Wall-Slabs, &c.; and I do hereby declare the following to be a full, clear, and exact description of the invention, such as will enable others skilled in the art to which it appertains to use the same.

This invention relates to an improved process for making flared adhering points on the backs of glass tiles, wall-slabs, and articles of a similar nature.

The object of the invention is the provision of a process by means of which the flared adhering points on the backs of glass tiles, wall-slabs, and analogous articles may be quickly and readily produced, and is more particularly directed to the treatment of the glass while in a plastic state, so that the points may be formed on the various articles in an inexpensive manner.

To this end the invention consists in a process wherein the glass after being placed upon a suitable rolling-table is rolled to a predetermined thickness and simultaneous with such rolling is indented with suitable devices for producing any desired design, after which the glass so rolled and indented is reduced in thickness and simultaneous with such reduction is expanded between the indentations, whereby the raised points of the glass are flared and the complete adhering points produced.

In the accompanying drawings, Figure 1 is a side elevation of a preferred form of machine for carrying into effect the herein-described process. Fig. 2 is an end elevation of another form of machine.

It will of course be understood that the effectiveness of the process is not limited to any particular form of machine; but it is deemed expedient to illustrate and describe a form which is preferably employed, and referring, therefore, to the drawings the letter A designates a rectangular rolling-table having a smooth surface, and upon this surface the molten or plastic material is cast. The table A is provided at its sides with trams or tracks D, and upon said tracks is mounted to travel a forming-roller B, which roller is provided upon its periphery with indenting devices $b$ of any desired configuration. By means of the roller B the plastic material is rolled to a predetermined thickness, and simultaneous with such rolling the surface of the material by means of the indenting devices $b$ is given a design or designs corresponding to the configuration of said devices. A reducing-roller C is also mounted upon the table A, said roller being provided with a smooth surface and being designed to follow the roller B; but it will be observed that said roller C moves in a plane below the plane of movement of the roller B. The effect of the roller C upon the plastic material is to reduce the thickness thereof to a greater extent than that to which it has been rolled by the roller B and simultaneous with such reduction to expand the material between the indentations formed by the devices $b$, whereby the raised points of the glass are flared and the adhering points of the desired configuration are produced.

To carry into effect the herein-described process, the molten or plastic material is cast upon the table A in advance of the roller B, whereupon said roller is moved forwardly, and during the passing of the roller B over the material the latter is rolled to a predetermined thickness. Simultaneous with such rolling the material is indented by the devices $b$ to produce the desired design upon the material, after which the roller C being advanced the material is acted upon by said roller and reduced in thickness. Simultaneous with such reduction the material between the indentations is expanded, thereby flaring the raised points, and the adhering points of the desired configuration are thus produced complete, after which the material may be placed in a suitable annealing-oven in the usual manner.

While Fig. 1 illustrates a preferred form of machine, it is obvious, as before stated, that any other may be substituted therefor, as that shown in Fig. 2, wherein is disclosed a machine for indenting the material longitudinally in lieu of transversely, and it will also be understood that many variations in the form of the indenting devices and the resultant products may be made without affecting the scope of the process.

Having thus described the invention, what is claimed as new, and desired to be secured by Letters Patent, is—

The herein-described process of forming flared adhering points on the backs of glass tiles, wall-slabs and analogous articles, which consists in rolling the material while in a plastic state to a predetermined thickness, indenting the material with a suitable design simultaneously with such rolling, then reducing the thickness of the material to a greater extent than that to which it has been primarily rolled, and simultaneous with such reduction expanding the material between the indentations to flare the raised points of the material to form the completed adhering points.

In testimony whereof I affix my signature in presence of two witnesses.

PHILLIP SEMMER.

Witnesses:
W. L. KIER,
J. T. BOYD.